United States Patent
Zhao

(10) Patent No.: US 12,167,059 B2
(45) Date of Patent: Dec. 10, 2024

(54) METHOD AND ELECTRONIC DEVICE FOR RECOMMENDING VIDEOS, AND STORAGE MEDIUM

(71) Applicant: BIGO TECHNOLOGY PTE. LTD., Singapore (SG)

(72) Inventor: Huizhu Zhao, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/246,004

(22) PCT Filed: Aug. 27, 2021

(86) PCT No.: PCT/CN2021/115027
§ 371 (c)(1),
(2) Date: Mar. 20, 2023

(87) PCT Pub. No.: WO2022/068492
PCT Pub. Date: Apr. 7, 2022

(65) Prior Publication Data
US 2023/0362423 A1 Nov. 9, 2023

(30) Foreign Application Priority Data
Sep. 29, 2020 (CN) .......................... 202011052701.1

(51) Int. Cl.
*H04N 21/258* (2011.01)
*H04N 21/25* (2011.01)

(52) U.S. Cl.
CPC ..... *H04N 21/251* (2013.01); *H04N 21/25891* (2013.01)

(58) Field of Classification Search
CPC ........... H04N 21/251; H04N 21/25891; H04N 21/4532; H04N 21/4667; H04N 21/4668
See application file for complete search history.

(56) References Cited

U.S. PATENT DOCUMENTS 8,489,515 B2    7/2013  Mathur
2012/0140633 A1*  6/2012  Stanwood ........ H04N 21/64723
                                                                370/235

(Continued)

FOREIGN PATENT DOCUMENTS

CN    102957950 A    3/2013
CN    103440335 A    12/2013

(Continued)

OTHER PUBLICATIONS

Extended European Search Report Communication Pursuant to Rule 62 EPC for European Application No. 21874153.6 dated Feb. 6, 2024, which is a foreign counterpart application to this application.

(Continued)

*Primary Examiner* — Rong Le
(74) *Attorney, Agent, or Firm* — Kolitch Romano Dascenzo Gates LLC

(57) ABSTRACT

Provided is a method for recommending videos. The method includes: acquiring an identifier of a video operated by a target account in history, and determining a tag weight of each of a plurality of video tags of the video corresponding to the identifier; determining, based on the tag weight of the each video tag, a video weight of each of a plurality of candidate videos in a predetermined candidate set; selecting, based on the video weight of the each candidate video, a target video from the candidate set for recommendation; and detecting, from video tags of a distributed video, a video tag that meets a predetermined condition, and reducing, based on the tag weight of the video tag that meets the predetermined condition, a weight of an undistributed candidate video with the video tag that meets the predetermined condition in the candidate set.

18 Claims, 3 Drawing Sheets

(56) References Cited

U.S. PATENT DOCUMENTS

| | | | |
|---|---|---|---|
| 2014/0013353 A1* | 1/2014 | Mathur | G06F 16/735 |
| | | | 725/34 |
| 2016/0212494 A1 | 7/2016 | Yang et al. | |
| 2017/0060870 A1 | 3/2017 | Checkley | |
| 2017/0171334 A1 | 6/2017 | Li | |
| 2019/0019036 A1 | 1/2019 | Yoo | |
| 2020/0097731 A1* | 3/2020 | Gupta | H04N 21/4667 |

FOREIGN PATENT DOCUMENTS

| | | | |
|---|---|---|---|
| CN | 105512331 A | 4/2016 | |
| CN | 106294830 A | 1/2017 | |
| CN | 106791963 A | 5/2017 | |
| CN | 109657138 A | 4/2019 | |
| CN | 110059221 A | 7/2019 | |
| CN | 110287372 A | 9/2019 | |
| CN | 112188295 A | 1/2021 | |
| IN | 109729395 A | 5/2019 | |
| WO | 2020029235 A1 | 2/2020 | |

OTHER PUBLICATIONS

International Search Report of the International Searching Authority for State Intellectual Property Office of the People's Republic of China in PCT application No. PCT/CN2021/115027 issued on Dec. 2, 2021, which is an international application to which this application claims priority.

The State Intellectual Property Office of People's Republic of China, First Office Action in Patent Application No. CN202011052701.1 issued on Dec. 24, 2021, which is a foreign counterpart application corresponding to this U.S. Patent Application, to which this application claims priority.

China National Intellectual Property Administration, Notification to Grant Patent Right for Invention of Chinese Application No. 202011052701.1 issued on May 26, 2022, which is foreign counterpart application of this US application.

* cited by examiner

METHOD AND ELECTRONIC DEVICE FOR RECOMMENDING VIDEOS, AND STORAGE MEDIUM

This application is a U.S. national stage of international application No. PCT/CN2021/115027, filed on Aug. 27, 2021, which claims priority to Chinese Patent Application No. 202011052701.1 filed on Sep. 29, 2020 and entitled "VIDEO RECOMMENDATION METHOD AND DEVICE," the disclosures of which are herein incorporated by reference in their entireties.

TECHNICAL FIELD

The present disclosure relates to the field of automated recommendation technologies, and in particular, relates to a method and an electronic device for recommending videos, and a storage medium.

BACKGROUND OF THE INVENTION

Short-form video applications can provide users with rich audio and video content, and the underlying recommendation system takes on the important work of selecting audio and videos that users are interested in from the massive resources of the platform. To satisfy the changing interests of different users, the recommendation system needs to capture users' points of interest in real-time and select matching short-form video content from a candidate set to improve the user experience.

SUMMARY OF THE INVENTION

The present disclosure provides a method and an electronic device for recommending videos, and a storage medium.

The present disclosure provides a method for recommending videos. The method includes:
  acquiring an identifier of a video operated by a target account in history, and determining a tag weight of each of a plurality of video tags of the video corresponding to the identifier;
  determining, based on the tag weight of the each video tag, a video weight of each of a plurality of candidate videos in a predetermined candidate set;
  selecting, based on the video weight of the each candidate video, a target video from the candidate set for recommendation; and
  detecting, from video tags of a distributed video, a video tag that meets a predetermined condition, and reducing, based on the tag weight of the video tag that meets the predetermined condition, a weight of an undistributed candidate video with the video tag that meets the predetermined condition in the candidate set.

The present disclosure further provides an electronic device for recommending videos. The device includes a memory, a processor, and a computer program stored in the memory and runnable on the processor, wherein the processor, when loading and running the computer program, is caused to perform the method for recommending videos described above.

The present disclosure further provides a non-transitory computer-readable storage medium storing a computer program. The computer program, when loaded and run by a processor, causes the processor to perform the method for recommending videos described above.

DETAILED DESCRIPTION

The present disclosure is described hereinafter with reference to the accompanying drawings and embodiments.

In the related art, to capture users' points of interest for audio and video content in real-time, one solution for the recommendation system for recommending audios and videos is to introduce user session data into the model training process during the recall and sort stages, which to some extent resolves the problem of determining the candidate set based on users' real-time points of interest. However, there is a delay in model updating, which results in insufficient control over the final distribution of videos, causing an insufficient or excessive distribution of points of interest. The embodiments of the present disclosure are provided to address the above discussed issues.

Embodiment I

Figure 1:
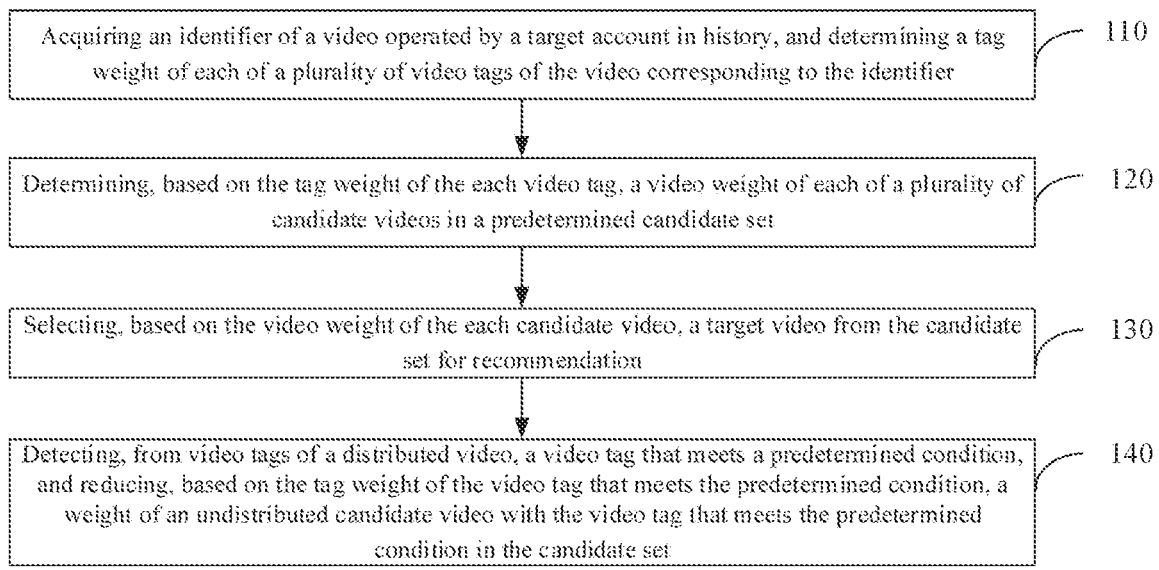
FIG. 1 is a flowchart of a method for recommending videos according to embodiments of the present disclosure.

FIG. 1 is a flowchart of a method for recommending videos according to the embodiments of the present disclosure. The embodiments are applicable to a video recommendation scenario, in particular, a short-form video recommendation scenario, and are implemented by an apparatus for recommending videos, which is applicable to a video application, a short-form video application, or a live broadcast application for video recommendation.

The embodiments include the following processes.

In 110, an identifier of a video operated by a target account in history is acquired, and a tag weight of each of a plurality of video tags of the video corresponding to the identifier is determined.

In some implementations, the identifier of the video previously operated by the target account is acquired from a log record.

Because one video has one or more video tags, and one video tag belongs to one or more videos, in some embodiments, the times of occurrences of each video tag of the video corresponding to the identifier of the video operated by the target account in the history is counted, the times of occurrences of each video tag is processed, such as normalization process, etc., and thus a tag weight of each video tag is acquired.

In 120, a video weight of each of a plurality of candidate videos in a predetermined candidate set is determined based on the tag weight of the each video tag.

In some embodiments, the candidate set in the above process is a collection of one or more candidate videos that match the target account and are determined by a common recommendation method.

Upon tag weight of each video tag appeared in a history operation record being determined by process 110, the video weight of the candidate video in the candidate set that is associated with the video tag appeared in the history is determined based on the tag weight of the each video tag appeared in the history.

Because one video includes one or more video tags, for each candidate video in the candidate set, the video tag of the candidate video is matched with the video tags with the determined tag weight, and thus the tag weight of the video tag of the candidate video is determined. For a video tag of the candidate video that does not have a matching item, the weight of the video tag is set to a predetermined value, for example, to a value of 0.

Then, the video weight of the candidate video is calculated based on the tag weight of the video tag of the candidate video. For example, a sum of the tag weights of the video tags of the candidate video is calculated as the video weight.

In 130, a target video is selected from the candidate set based on the video weight of the each candidate video for recommendation.

In some embodiments, upon the video weight of the each candidate video in the candidate set being determined, at least one candidate video with a largest video weight is selected as the target video, and the target video is recommended and distributed to a client.

In 140, a video tag that meets a predetermined condition is detected from video tags of a distributed video, and a weight of an undistributed candidate video with the video tag that meets the predetermined condition in the candidate set is reduced based on the tag weight of the video tag that meets the predetermined condition.

In some embodiments, the number of distributed videos corresponding to each video tag is monitored, and in response to a video tag meeting the predetermined condition, the distribution number of videos with the video tag is limited, to avoid a situation where the whole screen is full of videos of a single point of interest.

In the implementations, a weight of the undistributed video with the video tag whose video distribution number meets a predetermined condition is reduced. Therefore, the undistributed video is capable of being quickly withdrawn from distribution by reducing the weight of the undistributed videos, and thus a dynamic recommendation strategy for video distribution is achieved.

In the embodiments, the video weight of each candidate video in the candidate set is determined based on the acquired tag weight of each video tag of the video corresponding to the identifier of the video operated by the target account in the history; and upon a target video selected from the candidate set based on the video weight being recommended, a video tag of the distributed video that meets a predetermined condition is detected, and in response to the video tag that meets the predetermined condition being detected, a weight of the undistributed video with the video tag that meets the predetermined condition in the candidate set is reduced based on the tag weight of the video tag that meets the predetermined condition, so as to achieve a dynamic adjustment for the video weight, and thus ensure that the situation is avoided where the whole screen is full of videos of a single point of interest and meanwhile the videos of users' real-time points of interest is timely and effectively distributed. In this way, users' using experience of the video applications is improved, and indicators for the better user experience such as use time and frequency of use are increased. The method provided by the embodiments avoids the problem of insufficient or excessive distribution of the points of interest due to lack of sufficient control over the final distribution of video by the recommendation system.

Embodiment II

Figure 2:
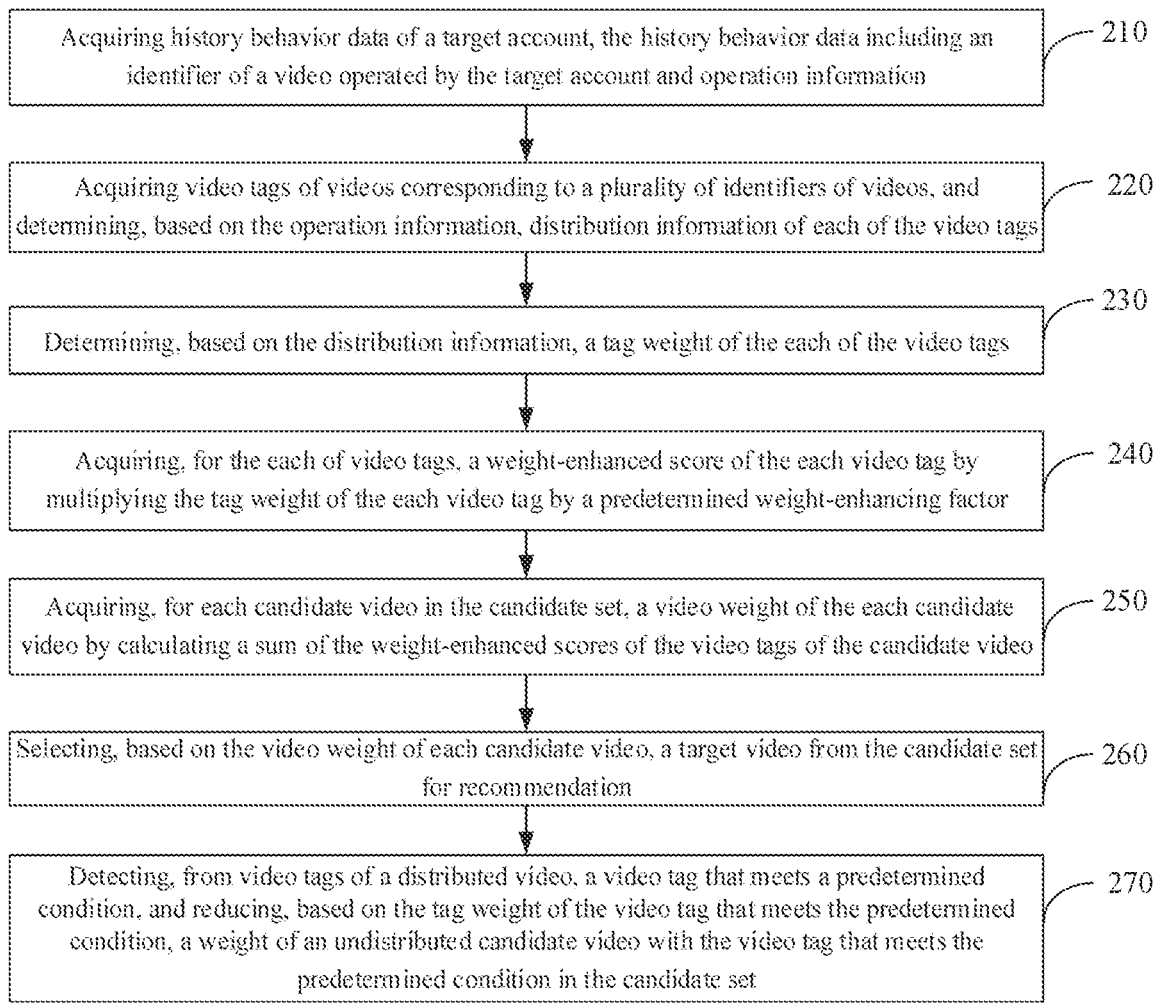
FIG. 2 is a flowchart of another method for recommending videos according to embodiments of the present disclosure.

FIG. 2 is a flowchart of a method for recommending videos according to the embodiments of the present disclosure. The embodiments are illustrated on the basis of the above embodiments and include the following processes.

In 210, history behavior data of a target account is acquired, the history behavior data including an identifier of a video operated by the target account and operation information.

In possible scenarios, before process 210, the embodiments further include: receiving a video pull request from a client, the video pull request including the target account.

Upon a user opening the video application and logging in to the target account, the client detects a video pull operation of the user and sends the video pull request to the apparatus for recommending videos in response to the operation, wherein the video pull request includes the target account. Upon receiving the video pull request, the apparatus for recommending videos acquires the target account by parsing the request and acquires the history behavior data of the target account.

In some embodiments, the history behavior data is behavior data of a latest session of the target account. The timeliness performance can be in seconds-scale by using the history behavior data of the latest session, which can improve the timeliness performance of recommendation of videos of interest in real-time. The latest session refers to the time period of the latest (i.e., last) communication between the target account and the server of the application. In some implementations, to improve users' access speed, a storage area is allocated for each session for storing the operation data of each session. In this way, in the video application, users' behavior data in each session is stored in the storage area of each session, such that the history behavior data of the target user is capable of being acquired from the storage area of the latest session of the target account.

In some embodiments, the history behavior data includes the identifier of the video operated by the target account and operation information, and the identifiers of the videos operated by the target account in the latest session are organized into a video sequence of $V=\{v_1, v_{22}, \ldots, v_k\}$. For example, in a case that the target user operates a total of 100 videos in the latest session, the video sequence is $V=\{v_1, v_{22}, \ldots, v_{100}\}$.

In some embodiments, the operation information includes positive operation information and negative operation information. The positive operation information includes giving a like, finishing a video play, sharing, giving a gift, and the like, and the negative operation information includes giving a downvote, giving a thumbs-down, and the like.

In 220, video tags of videos corresponding to a plurality of identifiers of videos are acquired, and distribution information of each of the video tags is determined based on the operation information.

In practice, one video includes one or more video tags (or hashtags). In some embodiments, video tags corresponding to each video identifier in the video sequence are acquired, and the video tags of each video are combined into a video tag sequence, which is represented as $T=\{\{t_{11}, \ldots, t_{1n}\}, \{t_{21}, \ldots, t_{2n}\}, \ldots \{t_{k1}, \ldots, t_{kn}\}\}$, wherein $\{t_{11}, \ldots, t_{1n}\}$, $\{t_{21}, \ldots, t_{2n}\}, \ldots \{t_{k1}, \ldots, t_{kn}\}$ respectively represent collections of video tags corresponding to different videos.

Upon acquiring the video tag sequence in which the video tag belongs to the video operated by the target account in the history, the distribution information of each video tag is capable of being determined based on the operation information of each video.

In some embodiments, determining the distribution information of each video tag based on the operation information in process 220 includes:

for each video tag, counting a first number of times and a second number of times as the distribution information, the first number of times being occurrence times of the positive operation information for the each of the video tags, and the second number of times being occurrence times of the negative operation information for the each of the video tags.

In practice, one video tag is possible to simultaneously have the positive operation information and negative operation information. For example, a user gives a like to video $v_1$, but gives a downvote to video $v_2$, and both videos have the tag $t_1$. Upon acquiring the video tag sequence, the first number of times and the second number of times are counted by taking the video tag as a unit, the first number of times being occurrence times of the positive operation information for each of the video tags, and the second number of times being occurrence times of the negative operation information for the each of the video tags. For example, in a case that a user gives likes to videos $v_1$ and $v_2$, but gives a downvote to video $v_3$, the video $v_1$ having tags $t_1$, $t_2$ and $t_3$, the video $v_2$ having tags $t_2$ and $t_4$, and video $v_3$ having tags $t_2$ and $t_3$, the first number of times of occurrence of the positive operation information for the tag $t_1$ is 1, and the second number of times of occurrence of the negative operation information for the tag $t_1$ is 0; the first number of times of occurrence of the positive operation information for the tag $t_2$ is 2, and the second number of times of occurrence of the negative operation information for the tag $t_2$ is 1; the first number of times of occurrence of the positive operation information for the tag $t_3$ is 1, and the second number of times of occurrence of the negative operation information for the tag $t_3$ is 1; and the first number of times of occurrence of the positive operation information for the tag $t_4$ is 1, and the second number of times of occurrence of the negative operation information for the tag $t_4$ is 0.

In some embodiments, the first number of times of occurrence of the positive operation information for the video tag and the second number of times of occurrence of the negative operation information for the video tag are used as the distribution information of the video tag.

In 230, a tag weight of the each of the video tags is determined based on the distribution information.

In some embodiments, upon acquiring the distribution information of each video tag, the tag weights $W'=\{w_1, w_2, \ldots, w_m\}$ of the video tags are determined based on the distribution of positive operation information and negative operation information of the video tags.

In some embodiments, process 230 includes the following processes.

In 230-1, a weight reference value for a corresponding video tag is calculated based on the first number of times and the second number of times.

In some embodiments, the weight reference value of the corresponding video tag is calculated based on the first number of times and the second number of times as follows: weight reference value=(k1+1)/(k1+k2+1), wherein k1 is the first number of times and k2 is the second number of times.

In 230-2, in response to the weight reference value being greater than a first predetermined value, the video tag is determined as a positive video tag, and the weight reference value is determined as the tag weight of the video tag.

In 230-3, in response to the weight reference value being smaller than a second predetermined value, the video tag is determined as a negative video tag, and the negative number of the weight reference value is determined as the tag weight of the video tag, wherein the second predetermined value is less than the first predetermined value.

In some embodiments, upon the video tag being determined as the positive video tag, the embodiments further include: adding the positive video tag to a collection of positive video tags.

In some other embodiments, upon the video tag being determined as the negative video tag, the embodiments further include: adding the negative video tag to a collection of negative video tags.

In some embodiments, upon acquiring the weight reference value of the video tag, in response to the weight reference value being greater than the first predetermined value, the video tag is determined as a positive video tag and added to a collection of positive video tags, and at the same time, the weight reference value is determined as the tag weight of the video tag. In response to the weight reference value being smaller than the second predetermined value, the video tag is determined as a negative video tag and added to a collection of negative video tags, and at the same time, the negative number of the weight reference value described above is determined as the tag weight of the video tag; wherein the second predetermined value is less than the first predetermined value.

In some embodiments, the video tags are divided into a collection of positive video tags and a collection of negative video tags. The video tags in the collection of positive video tags are more associated with positive operations, such as giving a like, finishing a video play, or sharing; the video tags in the collection of negative video tags are more associated with negative operations, such as giving a downvote or thumbs-down. Such division facilitates the subsequent determination of whether the weight-enhanced score of a video tag is positive or negative, so as to decide to use a weight-enhancing strategy or a weight-reducing strategy during the video recommendation process.

In 240, for each of the video tags, a weight-enhanced score of the each video tag is acquired by multiplying the tag weight of the each video tag by a predetermined weight-enhancing factor.

In some embodiments, the weight-enhancing factor is empirically determined, for example, a constant between 1 and 5. The weight-enhanced score of the each video tag is acquired by multiplying the tag weight of the each video tag by the predetermined weight-enhancing factor. For the video tags in the collection of positive video tags, because their tag weight is positive, the corresponding weight-enhanced score is also positive; and for the video tags in the collection of negative video tags, because their tag weight is negative, the corresponding weight-enhanced score is also negative.

In 250, for each candidate video in the candidate set, a video weight of the each candidate video is acquired by calculating a sum of the weight-enhanced scores of the video tags of the candidate video.

In the process, the candidate set is a collection of a plurality of candidate videos that are initially selected by the recommendation apparatus for the target account using a common method. In some embodiments, the common method is a method used by the recommendation system in the art. The content of the candidate set is usually broad, that is, the candidate set includes many candidate videos that users are interested in. However, the display pit resources for videos are limited, it is needed to select the content with optimal real-time performance.

In some embodiments, for each candidate video in the candidate set, the video tags carried by the candidate video are acquired, and then each video tag of the candidate video is traversed to determine whether the each video tag has a corresponding weight-enhanced score. In the case that a video tag has a weight-enhanced score, the weight-enhanced score is acquired. In the case that a video tag does not have a weight-enhanced score, the weight-enhanced score for the video tag is set to a value of 0. Then, the video weight of the candidate video is acquired by calculating a sum of the weight-enhanced scores of all of the video tags of the candidate video.

In some embodiments, for example, candidate video 1 carries tags $t_1$ and $t_2$, where the weight-enhanced score of tag $t_1$ is 0.5 and the weight-enhanced score of tag $t_2$ is 0.7, then the video weight of the candidate video is 0.5+0.7=1.2. In some other embodiments, for example, candidate video 2 carries tags $t_1$ and $t_5$, where the weight-enhanced score of tag $t_1$ is 0.5 and the weight-enhanced score of tag $t_5$ is −2, then the video weight of the candidate video is 0.5+(−2)=−1.5. In the case that the video weight is negative, it is ensured that the videos users do not like are quickly withdrawn from the distribution, avoiding the continuous distribution of videos of negative points of interest.

In 260, a target video is selected from the candidate set based on the video weight of each candidate video for recommendation.

In some implementations, upon the video weight of each candidate video in the candidate set being determined, the plurality of candidate videos in the candidate set is sorted according to the video weight, then one or more candidate videos with the largest video weight are selected as the target videos, and the target videos are recommended and distributed to the client.

In 270, a video tag that meets a predetermined condition is detected from video tags of a distributed video, and a weight of an undistributed candidate video with the video tag that meets the predetermined condition in the candidate set is reduced based on the tag weight of the video tag that meets the predetermined condition.

In some embodiments, a number of distributed videos corresponding to each video tag is counted, and in response to the number of the distributed videos corresponding to a video tag reaching a predetermined threshold number, it is determined that the video tag meets the predetermined condition, and then a weight of an undistributed video with the video tag in the candidate set is reduced, such that the subsequent distribution amount of videos with the video tag is limited, avoiding a situation where the whole screen is full of videos of a single point of interest.

In some embodiments, process 270 includes:

acquiring a new video weight for the candidate video by subtracting the weight-enhanced score of the video tag that meets the predetermined condition from the video weight of the undistributed candidate video with the video tag that meets the predetermined condition in the candidate set.

In the embodiments, the process of reducing a weight includes: for the undistributed candidate video in the candidate set, it is determined whether the undistributed candidate video described above has the video tag that meets the predetermined condition; and in response to the undistributed candidate video described above having the video tag that meets the predetermined condition, the weight of the candidate video with the video tag that meets the predetermined condition is reduced, that is, the new video weight for the candidate video is acquired by subtracting the weight-enhanced score of the video tag that meets the predetermined condition from the video weight of the candidate video, and thus a dynamic adjustment is achieved for the video weight of the candidate video.

For example, assuming that the video operated by the target account in the history has three video tags: A, B, and C, whose corresponding weight-enhanced scores are respectively 1, 0.5, and 0.1, then the weight of all videos with tag A in the candidate set (referred to herein as type-A videos) is increased by 1 point, the weight of all videos with tag B in the candidate set (referred to herein as type-B videos) is increased by 0.5 points, and the weight of all videos with tag C in the candidate set (referred to herein as type-C videos) is increased by 0.1 points. As display pits being continuously occupied, in response to the distribution demand for type-A videos is satisfied, the weight enhancement for the remaining type-A video in the candidate set is canceled, that is, the weight of the remaining type-A videos is reduced by 1 point; in response to the distribution demand for type-B videos is satisfied, the weight enhancement for the remaining type-B video in the candidate set is canceled, that is, the weight of the remaining type-B video is reduced by 0.5 points; and in response to the distribution demand for type-C video is satisfied, the weight enhancement for the remaining type-C video in the candidate set is canceled, that is, the weight of the remaining type-C video is reduced by 0.1 points. Through the above dynamic weight enhancement process, the distribution probability of videos of the points of interest A, B, and C is greatly improved. Furthermore, a situation where the whole screen is full of videos of a single point of interest is avoided by reducing a weight of the video of the point of interest whose distribution number exceeds a certain number, such that the demands and interests of users are satisfied.

To capture the changing interests of users in real-time, in the embodiments, the tag weight of each video tag is determined based on the video tags carried by the video corresponding to the video identifier in the short-term history behavior data of the target account, then the real-time weight-enhanced score of the video tag is determined based on the tag weight, and the video weight of each candidate video in the candidate set is calculated based on the weight-enhanced score of each video tag, such that the timely distribution of videos of users' real-time points of interest is ensured and the distribution probability of the videos is improved. Then, in response to a video tag that meets a predetermined condition is detected from video tags of the distributed video, the weight of the undistributed video with the video tag in the candidate set is reduced based on the tag weight of the video tag, such that the video weight of each candidate video in the candidate set is dynamically adjusted. Based on the adjusted video weight of each candidate video in the candidate set, in some embodiments, the method may include selecting at least one candidate video in the candidate set as a target video. For example, the target video may be a video having the greatest video weight in the candidate set. That is, the method may include selecting a target video from a candidate video set with dynamically changed video weights, and controlling the recommendation of the target video to the target account accordingly.

Embodiment III

Figure 3:
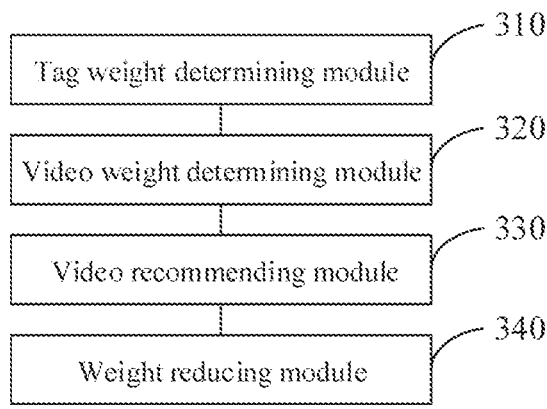
FIG. 3 is a structural block diagram of an apparatus for recommending videos according to the embodiments of the present disclosure.

FIG. 3 is a structural block diagram of an apparatus for recommending videos according to the embodiments of the present disclosure. In some embodiments, the apparatus for recommending videos is disposed within a server and includes:

a tag weight determining module 310, configured to acquire an identifier of a video operated by a target account in history, and determine a tag weight of each of a plurality of video tags of the video corresponding to the identifier; a video weight determining module 320, configured to determine, based on the tag weight of the each video tag, a video weight of each of a plurality of candidate videos in a predetermined candidate set; a video recommending module 330, configured to select, based on the video weight of the each candidate video, a target video from the candidate set for recommendation; and a weight reducing module 340, configured to detect, from video tags of a distributed video, a video tag that meets a predetermined condition, and reduce, based on the tag weight of the video tag that meets the predetermined condition, a weight of an undistributed candidate video with the video tag that meets the predetermined condition in the candidate set.

The apparatus for recommending videos according to the embodiments of the present disclosure described above is capable of executing the method for recommending videos according to any embodiments of the present disclosure, and has corresponding functional modules for executing the method and achieves similar effects.

Embodiment IV

Figure 4:
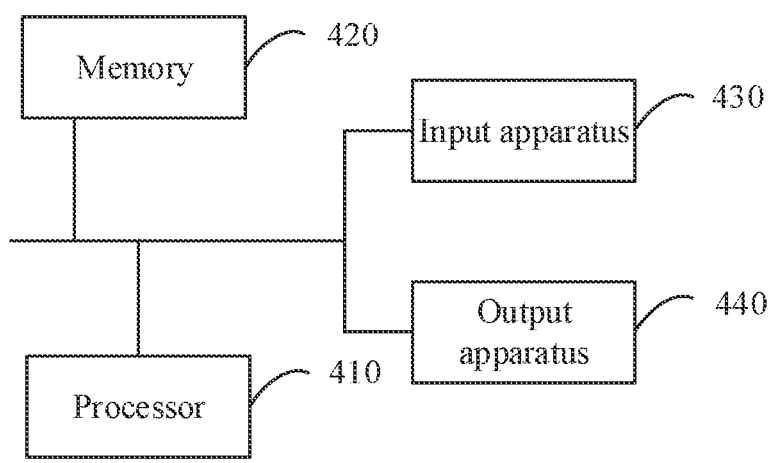
FIG. 4 is a schematic structural diagram of an electronic device according to the embodiments of the present disclosure.

FIG. 4 is a schematic structural diagram of an electronic device according to the embodiments of the present disclosure. As shown in FIG. 4, the electronic device includes a processor 410, a memory 420, an input apparatus 430, and an output apparatus 440. In some embodiments, the number of the processors 410 in the electronic device is one or more, and one processor 410 is shown in FIG. 4 as an example. The processor 410, the memory 420, the input apparatus 430, and the output apparatus 440 in the electronic device are connected via a bus or other means, and by way of example, they are connected via a bus in FIG. 4.

In some embodiments, the memory 420, as a computer-readable storage medium, is configured to store software programs, computer executable programs, or modules, such as program instructions/modules corresponding to the method for recommending videos in the embodiments of the present disclosure. The software programs, instructions, or modules stored in the memory 420, when loaded and run by the processor 410, cause the processor 410 to execute various functional applications of the electronic device and perform data processing, that is, implement the method for recommending videos described above.

Embodiment V

The embodiments of the present disclosure further provide a non-transitory computer-readable storage medium including computer-executable instructions. The computer-executable instructions, when loaded and run by a processor of a server, cause the server to perform the method for recommending videos in any one of Embodiments I to II.

For the embodiments of the apparatus, the electronic device, and the storage medium, because they are substantially similar to the method embodiments, the descriptions are relatively simple, and for relevant parts, reference is made to part of the descriptions of the method embodiments.

What is claimed is:

1. A method for recommending videos, comprising:
acquiring an identifier of a video operated by a target account in history, and determining a tag weight of each of a plurality of video tags of the video corresponding to the identifier;
determining, based on the tag weight of the each video tag, a video weight of each of a plurality of candidate videos in a predetermined candidate set;
selecting, based on the video weight of the each candidate video, a target video from the candidate set for recommendation; and
detecting, from video tags of a distributed video, a video tag that meets a predetermined condition, and reducing, based on the tag weight of the video tag that meets the predetermined condition, a weight of an undistributed candidate video with the video tag that meets the predetermined condition in the candidate set;
wherein determining, based on the tag weight of the each of video tags, the video weight of each of the plurality of candidate videos in the predetermined candidate set comprises:
for the each of video tags, acquiring a weight-enhanced score of the each video tag by multiplying the tag weight of the each of video tags by a predetermined weight-enhancing factor; and
for each candidate video in the candidate set, acquiring the video weight of the each candidate video by calculating a sum of the weight-enhanced scores of the video tags of the candidate video; and
wherein reducing, based on the tag weight of the video tag that meets the predetermined condition, the weight of the undistributed candidate video with the video tag that meets the predetermined condition in the candidate set comprises:
acquiring a new video weight for the candidate video by subtracting the weight-enhanced score of the video tag that meets the predetermined condition from the video weight of the undistributed candidate video with the video tag that meets the predetermined condition in the candidate set.

2. The method according to claim 1, wherein acquiring the identifier of the video operated by the target account in history, and determining the tag weight of each of the plurality of video tags of the video corresponding to the identifier comprise:
acquiring history behavior data of the target account, the history behavior data comprising a plurality of identifiers of videos operated by the target account and operation information;
acquiring a plurality of video tags of videos corresponding to the plurality of identifiers of videos, and determining, based on the operation information, distribution information of each of the video tags; and
determining, based on the distribution information, the tag weight of the each of the video tags.

3. The method according to claim 2, wherein the operation information comprises positive operation information and negative operation information; and
determining, based on the operation information, the distribution information of the each of the video tags comprises:
for the each of the video tags, counting a first number of times and a second number of times as the distribution information, the first number of times being occurrence times of the positive operation information for the each of the video tags, and the second number of times being occurrence times of the negative operation information for the each of the video tags.

4. The method according to claim 3, wherein determining, based on the distribution information, the tag weight of the each of the video tags comprises:
   calculating, based on the first number of times and the second number of times, a weight reference value for the each of video tags;
   in response to the weight reference value being greater than a first predetermined value, determining the each of video tags as a positive video tag, and determining the weight reference value as the tag weight of the each of video tags; and
   in response to the weight reference value being smaller than a second predetermined value, determining the each of video tags as a negative video tag, and determining a negative number of the weight reference value as the tag weight of the each of video tags;
   wherein the second predetermined value is less than the first predetermined value.

5. The method according to claim 4, wherein
   upon determining the each of video tags as the positive video tag, the method further comprises:
      adding the positive video tag to a collection of positive video tags; and
   upon determining the each of video tags as the negative video tag, the method further comprises:
      adding the negative video tag to a collection of negative video tags.

6. The method according to claim 4, wherein calculating, based on the first number of times and the second number of times, the weight reference value for the each of video tags comprises:

the weight reference value=(the first number of times+1)/(the first number of times+the second number of times+1).

7. The method according to claim 2, wherein the history behavior data is behavior data of a latest session of the target account.

8. The method according to claim 1, wherein detecting, from the video tags of the distributed video, the video tag that meets the predetermined condition comprises:
   counting a number of distributed videos corresponding to the each of video tags; and
   in response to the number of the distributed videos corresponding to a video tag reaching a predetermined threshold number, determining that the video tag meets the predetermined condition.

9. The method according to claim 1, wherein selecting, based on the video weight of each candidate video, the target video from the candidate set for recommendation comprises:
   sorting, based on the video weight, the plurality of candidate videos in the candidate set; and
   selecting at least one candidate video with a greatest video weight as the target video.

10. The method according to claim 1, wherein prior to acquiring the identifier of the video operated by the target account in history, the method further comprises:
   receiving a video pull request from a client, wherein the video pull request comprises the target account.

11. An electronic device for recommending videos, comprising a memory, a processor, and a computer program stored in the memory and runnable on the processor, wherein the processor, when loading and running the computer program, is caused to perform:
   acquiring an identifier of a video operated by a target account in history, and determining a tag weight of each of a plurality of video tags of the video corresponding to the identifier;
   determining, based on the tag weight of the each video tag, a video weight of each of a plurality of candidate videos in a predetermined candidate set;
   selecting, based on the video weight of the each candidate video, a target video from the candidate set for recommendation; and
   detecting, from video tags of a distributed video, a video tag that meets a predetermined condition, and reducing, based on the tag weight of the video tag that meets the predetermined condition, a weight of an undistributed candidate video with the video tag that meets the predetermined condition in the candidate set;
   wherein determining, based on the tag weight of the each of video tags, the video weight of each of the plurality of candidate videos in the predetermined candidate set comprises:
   for the each of video tags, acquiring a weight-enhanced score of the each video tag by multiplying the tag weight of the each of video tags by a predetermined weight-enhancing factor; and
   for each candidate video in the candidate set, acquiring the video weight of the each candidate video by calculating a sum of the weight-enhanced scores of the video tags of the candidate video; and
   wherein reducing, based on the tag weight of the video tag that meets the predetermined condition, the weight of the undistributed candidate video with the video tag that meets the predetermined condition in the candidate set comprises:
   acquiring a new video weight for the candidate video by subtracting the weight-enhanced score of the video tag that meets the predetermined condition from the video weight of the undistributed candidate video with the video tag that meets the predetermined condition in the candidate set.

12. The electronic device for recommending videos according to claim 11, wherein the processor, when loading and running the computer program, is caused to perform:
   acquiring history behavior data of the target account, the history behavior data comprising a plurality of identifiers of videos operated by the target account and operation information;
   acquiring a plurality of video tags of videos corresponding to the plurality of identifiers of videos, and determining, based on the operation information, distribution information of each of the video tags; and
   determining, based on the distribution information, the tag weight of the each of the video tags.

13. The electronic device for recommending videos according to claim 12, wherein the operation information comprises positive operation information and negative operation information; and
   the processor, when loading and running the computer program, is caused to perform:
      for the each of the video tags, counting a first number of times and a second number of times as the distribution information, the first number of times being occurrence times of the positive operation information for the each of the video tags, and the second number of times being occurrence times of the negative operation information for the each of the video tags.

14. The electronic device for recommending videos according to claim 13, wherein the processor, when loading and running the computer program, is caused to perform:
- calculating, based on the first number of times and the second number of times, a weight reference value for the each of video tags;
- in response to the weight reference value being greater than a first predetermined value, determining the each of video tags as a positive video tag, and determining the weight reference value as the tag weight of the each of video tags; and
- in response to the weight reference value being smaller than a second predetermined value, determining the each of video tags as a negative video tag, and determining a negative number of the weight reference value as the tag weight of the each of video tags;
- wherein the second predetermined value is less than the first predetermined value.

15. The electronic device for recommending videos according to claim 14, wherein the processor, when loading and running the computer program, is caused to perform:
- upon determining the each of video tags as the positive video tag, adding the positive video tag to a collection of positive video tags; and
- upon determining the each of video tags as the negative video tag, adding the negative video tag to a collection of negative video tags.

16. The electronic device for recommending videos according to claim 14, wherein the processor, when loading and running the computer program, is caused to calculate:

the weight reference value=(the first number of times+1)/(the first number of times+the second number of times+1).

17. The electronic device for recommending videos according to claim 12, wherein the history behavior data is behavior data of a latest session of the target account.

18. A non-transitory computer-readable storage medium, storing a computer program, wherein the program, when loaded and run by a processor, causes the processor to perform:
- acquiring an identifier of a video operated by a target account in history, and determining a tag weight of each of a plurality of video tags of the video corresponding to the identifier;
- determining, based on the tag weight of the each video tag, a video weight of each of a plurality of candidate videos in a predetermined candidate set;
- selecting, based on the video weight of the each candidate video, a target video from the candidate set for recommendation; and
- detecting, from video tags of a distributed video, a video tag that meets a predetermined condition, and reducing, based on the tag weight of the video tag that meets the predetermined condition, a weight of an undistributed candidate video with the video tag that meets the predetermined condition in the candidate set;
- wherein determining, based on the tag weight of the each of video tags, the video weight of each of the plurality of candidate videos in the predetermined candidate set comprises:
- for the each of video tags, acquiring a weight-enhanced score of the each video tag by multiplying the tag weight of the each of video tags by a predetermined weight-enhancing factor; and
- for each candidate video in the candidate set, acquiring the video weight of the each candidate video by calculating a sum of the weight-enhanced scores of the video tags of the candidate video; and
- wherein reducing, based on the tag weight of the video tag that meets the predetermined condition, the weight of the undistributed candidate video with the video tag that meets the predetermined condition in the candidate set comprises:
- acquiring a new video weight for the candidate video by subtracting the weight-enhanced score of the video tag that meets the predetermined condition from the video weight of the undistributed candidate video with the video tag that meets the predetermined condition in the candidate set.

* * * * *